United States Patent Office 3,118,506
Patented Jan. 21, 1964

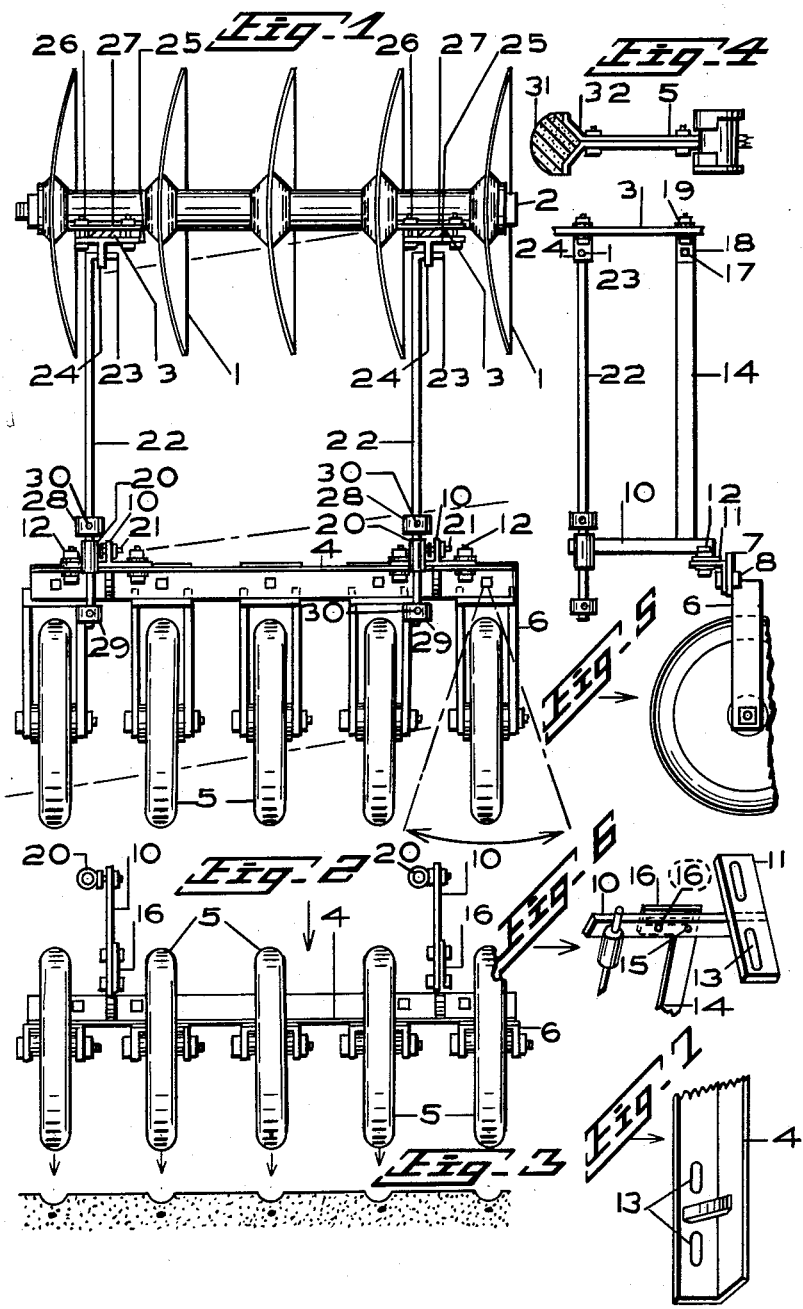

3,118,506
PRESS WHEEL AND DEPTH CONTROL
ATTACHMENT FOR DISK
George Henry Morris, Yorkton, Saskatchewan, Canada
Filed Sept. 19, 1960, Ser. No. 56,988
2 Claims. (Cl. 172—184)

This invention relates to a press wheel attachment and depth control for disks.

In the art to which the invention applies it has been proposed to provide a series of press wheels attachable as a unit in following relation to disk implements equipped with seeding attachments. In these a depth control for the disks is usually provided, but such control is not automatic and must be manually adjusted, and cannot take into account variations in soil conditions and other factors producing uneven penetration of the disks and depth of seeding.

The present invention is designed to provide improvements in such devices by combining with a press wheel section a depth control responsive to movements of the disk to provide support for the disk and automatically impose a limitation on depth variations of the disks and the seeding depth. In addition improvements in the press wheel structure are provided as will become apparent by reference to the accompanying description taken in conjunction with the drawings.

In the drawings, wherein is illustrated a preferred embodiment of the invention, FIG. 1 is a top plan view of a press wheel section in accordance with my invention, shown as attached in following relation to a disk section.

FIG. 2 is a rear end view of the press wheel section.

FIG. 3 shows a section through ground over which the disk and press wheel section have traveled, illustrating the packing of the seed beds by the wheels.

FIG. 4 is a detail view, partly in section and broken away, illustrating attachment of the wheel tire to the rim.

FIG. 5 shows a side view of the press wheel section, illustrated as broken away in parts.

FIG. 6 is an enlarged perspective view of the elements for connection of the press wheel section to the disk, in part broken away.

FIG. 7 is an enlarged perspective of a fragment of the press wheel section frame, and to which the elements shown in FIGURE 6 attach.

The principle of depth control for a one way disk through a press wheel section connected for travel in following relation thereto is shown in the drawings as applicable to a disk of a character with which seeding elements are used.

In accordance with the present invention a disk unit is shown having disks 1 on a gangshaft 2 and including vertical frame members 3 that form a part of the frame structure of the unit, this unit being one of a group of two or more such units connected in line abreast as an assembly forming the complete implement.

Such an implement usually includes a depth control embodying manually adjustable spring means by which the depth of seeding is to be set, the control applying independently to each of the units forming the assembly, each unit being adapted to swing upward against the tension of the spring means according to the contour of the land or when encountering rocks.

The press wheel section as herein disclosed consists of an angle cross frame bar 4 to which attach forks 6 carrying wheels 5 on greased sealed ball or other type bearings, a press wheel being provided for each furrow opened by a blade of the disk. The forks 6 are fixed to plates 7 that pivotally attach on the under side of the bar 4 by bolts 8 with the press wheels free to swing, as indicated by the arrows 9 in FIGURE 1, so that the press wheels may follow the line of travel of the disk blades while the disk unit is turning on curves, the inner press wheels being capable of turning through angles of from thirty to forty-five degrees and the outer press wheels being free to follow the travel of the machine. In FIGURE 3 is shown the furrows in which the seed has been deposited and pressed down by the press wheels.

For attachment of the press wheel section in following relation to the disk uprights 10 are provided fixed on plates 11 that attach by bolts 12 to the frame bar 4, the plates 11 having elongated openings 13 for the bolts and the frame bar 4 having complementary openings 13' to permit endwise adjustment of the plates on the frame bar 4, so that the press wheel section may be aligned in relation to the disk. To the lower parts of these uprights are attached bars 14, approximately aligned on a horizontal level with the gangshaft 2, by bolts 15 engaging angular end portions 16 of the bars, for which slotted openings, as at 16', are provided in the end portions 16, this being required to keep the bars 10 forming the uprights in vertical position, compensating for rearward angling of the uprights 3. Forwardly the bars 14 pivotally attach by bolts 17 to lugs 18 on bracket plates 19 attached by bolts 19' to the vertical frame members 3 of the disk unit.

On the uprights 10, at the upper ends, are pivoted sleeves 20 attached by bolts 21, and in which sleeves are slidable rods 22, the rods having bent ends 23 pivotally engaging suitable openings in lugs 24 on plates 25 that attach by bolts 26 and plates 27 to the frame members 3. On the rods 22 are collars 28 and 29, forwardly and rearwardly of the sleeves 20, attachable by set screws 30.

In FIGURE 4 is shown the mounting of tires 31 on rims 32 of the press wheels 5, the rims being outwardly tapered, V shaped in cross section, and in which the complementary shaped tire is seated, this serving to deflect loose soil off the sides to prevent it being carried up and dropped on the wheel bearings.

In the use of the machine, the press wheels are normally employed when the disk is equipped with a seeding attachment, so as to pack the ground directly over where the seed is laid, making the ground firm around the seed for better and quicker germination. When the disk drops or rises owing to variations in the ground level this would normally result in unequal penetration of the disks and unequal depth of seeding, but in the present arrangement this is offset by the depth control by applying excess pressure of the disks on to the press wheels and controlling the depth by the collars 28 and 29. This is important for obtaining better and more uniform growth.

The collars 28 and 29 are attached, spaced if required from the sleeves 20, which would permit a limited floating movement both ways of the press wheels depth control rod 22, this being variable by adjustment of the spacing of the collars.

The spacing of the collar 29 from the sleeve 20 permits the press wheels to drop below that of the disks for shallow seeding if desired. But by adjustment of the spacing of the collar 28 from the sleeve 20 the depth of penetration of the disks can be controlled. As the disk unit drops it pivots on the bolts 17 of the bars 14 that are adjustably attached to the uprights 10, and this brings the collars 28 against the sleeves 20, resulting in further drop of the disk being opposed by the flotation of the press wheel section, and by this the depth of penetration of the disks and seed can be controlled by the spacing of the collars 28 on each side from the sleeves 20, since further drop of the disks forces down on the press wheels, which have a good carrying capacity. Each unit of the disk can swing independently of the other disk units with which it forms the disk assembly, and each press wheel section is separately attached to a corresponding disk unit and will move with its disk unit independently of the other units.

For travel, when the disk unit is raised it pulls forward on the rod 22 until the collar 29 contacts the sleeve 20, when the press wheel section will be raised with the disk unit.

The press wheels are attached to the bar 4 at the same spacing as the disks and may be endwise adjusted in the longitudinal holes 13 and 13' so as to have the wheels moving directly over the seed. The press wheel section, by its pivotal attachment, may raise or lower independently of the disk unit.

This floating action of the press wheel section is obtained by spacing the collars 28 and 29 from the sleeves 20 and may be varied as desired. The bar 4 may be weighted to permit the press wheels to pack independently of the disk unit.

It might be noted that the desired control of the depth of the disks below the press wheels is obtained by the spacing of the collars 28 from the sleeves 20, and a seeding depth of from one half to four inches may be provided for.

When the pressure is applied the press wheels will sink into the ground to some extent, depending on conditions and looseness of the soil, and make ridges. The uniform depth of seeding, however, is controlled in comparison with that of the press wheels. This sinking into the ground of the press wheels is desirable, especially in dry conditions, and leaves the ground uneven, preventing soil drifting and allowing the unpacked portion to protect the seed rows. This also protects the seed from winds and possibly light frosts.

The press and depth control can also be applied to a conventional seed grain drill.

What I claim and wish to secure by Letters Patent is:

1. A disk section including vertical frame members, a press wheel section having a cross frame bar, said press wheel section having press wheels and means mounting the wheels in supporting relation to the cross frame bar free to swing sidewise and fixed against vertical movement in relation thereto, uprights fixed to the press wheel section frame cross bar in opposing relation to the disk section vertical frame members when said sections are aligned in following relation the one to the other, connecting bars fixed to the press wheel section uprights, means pivotally attaching said bars to the disc section vertical frame members, rods pivotally connected to said vertical frame members, and means pivotally attaching said rods to the press wheel section uprights, said pivotably attaching means for said rod including means mounting the rods to be endwise slidable a limited distance.

2. Means for attachment of a press wheel section in following relation to a disk section capable of rendering support to the disk section, said disk section having vertical frame members and the press wheel section having a cross frame bar to which a series of press wheels are attached by means of forks pivoted to said frame bar to swing sidewise and fixed against upward movement in relation to the cross frame bar, uprights fixed to the press wheel section frame bar in opposing relation to the disk section vertical frame members when the press wheel and disk sections are in following relation the one to the other, connecting bars fixed to the lower portions of said uprights, means pivotally attaching said bars to the lower portions of opposing disk section vertical frame members, rods pivotally attached to the upper portions of the vertical frame members, and means pivotally attaching said rods to the upper portions of said uprights, said means being sleeves intermediately pivoted to the uprights and in which the rods are slidable, and means limiting the sliding movement of said rods in the sleeves.

References Cited in the file of this patent

UNITED STATES PATENTS

| 498,704 | Casaday | May 30, 1893 |
| 1,962,349 | Johnson | June 12, 1934 |
| 2,337,662 | Johnson | Dec. 28, 1943 |
| 2,354,886 | Silver | Aug. 1, 1944 |
| 2,657,652 | Graham | Nov. 3, 1953 |
| 2,704,524 | McIntyre | Mar. 22, 1955 |
| 2,760,421 | Silver | Aug. 28, 1956 |
| 2,828,968 | Engler | Apr. 1, 1958 |

FOREIGN PATENTS

| 571,122 | France | Jan. 26, 1924 |